No. 674,332. Patented May 14, 1901.
B. B. BREWER.
DRAW PLATE AND STAND FOR MAKING SEAMLESS GOLD CROWNS FOR TEETH.
(Application filed Sept. 10, 1900.)
(No Model.)
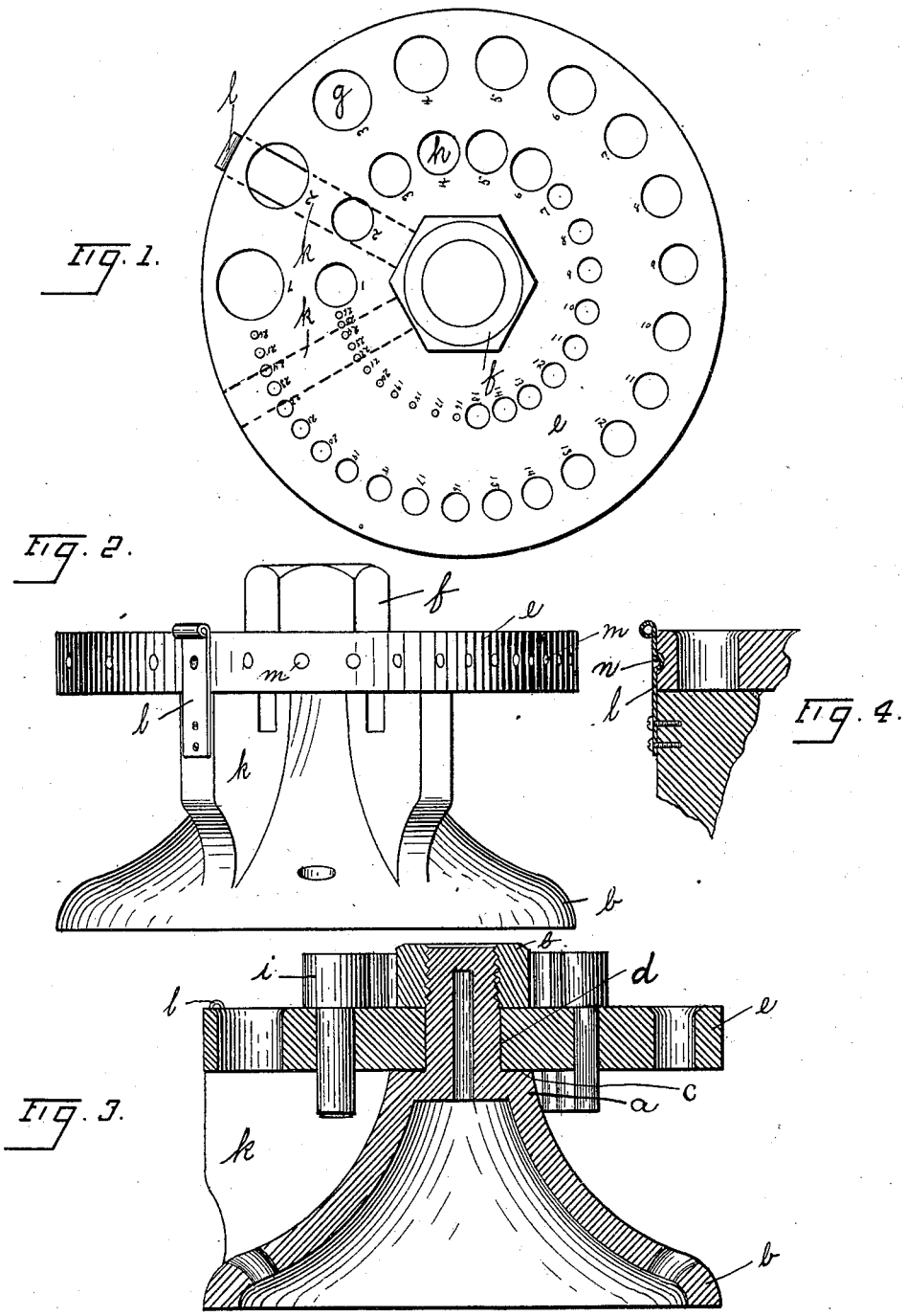
WITNESSES:
INVENTOR.
BY
ATTORNEY.

UNITED STATES PATENT OFFICE.

BENJAMIN B. BREWER, OF SAN FRANCISCO, CALIFORNIA.

DRAW-PLATE AND STAND FOR MAKING SEAMLESS GOLD CROWNS FOR TEETH.

SPECIFICATION forming part of Letters Patent No. 674,332, dated May 14, 1901.

Application filed September 10, 1900. Serial No. 29,588. (No model.)

*To all whom it may concern:*

Be it known that I, BENJAMIN B. BREWER, a citizen of the United States, residing at San Francisco, in the county of San Francisco and State of California, have invented certain new and useful Improvements in Draw-Plates and Stands for Making Seamless Gold Crowns for Teeth, of which the following is a specification.

My invention relates to an improved draw-plate and stand for making seamless gold crowns for teeth, the object of my invention being to provide an apparatus of this character which shall permit of great rapidity, certainty, and convenience in operation.

My invention therefore resides in the novel construction, combination, and arrangement of parts for the above ends hereinafter fully specified, and particularly pointed out in the claims.

In the accompanying drawings, Figure 1 is a plan view of my improved apparatus. Fig. 2 is a central vertical section thereof on the line A A of Fig. 1. Fig. 3 is a side elevation with the mandrels in position, and Fig. 4 is a broken vertical section through the spring-stop for the draw-plate.

Referring to the drawings, $a$ represents a stand for supporting the draw-plate. The base $b$ for said stand is circular in form, and above said base the stand rises in a conical form to a shoulder $c$. From said shoulder the base extends vertically in the form of a cylinder $d$ and forms a bearing for the draw-plate $e$, which rests upon the shoulder $c$. Above said draw-plate the cylinder $c$ is threaded, and a nut $f$ is screwed thereon to retain the draw-plate in place, a sufficient space, however, being left between the nut $f$ and the shoulder $c$ to permit the draw-plate to revolve freely upon said shoulder.

The draw-plate $e$ is in form a circular disk. It is provided with two circular series of circular holes. The outer holes $g$ are for the purpose of reducing a circular disk of gold into the form of a cup, and the inner holes $h$ are for the purpose of supporting the mandrels $i$, by means of which said cup is formed. The outer holes $g$ are preferably beveled slightly at their upper edge to reduce the diameter of the cup forced therethrough. The inner holes $h$ are for the purpose of supporting the stems of the mandrels, the heads thereof resting above the plate $e$. In the outer series the holes gradually diminish in size and are suitably graduated so as to reduce a disk, say, one inch in diameter to a cup, say, one-eighth of an inch in diameter. In like manner the heads of the mandrels gradually diminish in diameter, although the stems thereof, and therefore also the holes $h$, may be made of only three or four different sizes.

From the base $a$ extend upward two radial anvil-like projections or supports $k$. The upper faces of the said anvils $k$ are in close proximity to the lower surface of the draw-plate $e$, and they radiate from the center at a comparatively small angle, as shown in dotted lines in Fig. 1. The object of these supports is to hold the draw-plate steady and solid while hammering or driving the mandrels through the holes in said plate to reduce the diameter of the cup. Each anvil has a transverse recess cut through its top tangentially to the inner circular series of holes $h$ in order to permit the lower ends of the mandrels to pass freely over said anvils. The holes of the outer and inner series are each numbered in order, and in each of the inner holes there rests a mandrel, also suitably numbered corresponding to its size, to be used in conjunction with the corresponding holes of the outer series.

In operation the dentist takes a disk of gold of proper size to just fit the top of the largest of the holes $g$ and moves the draw-plate around until said largest hole comes between the two anvil-like supports $k$. He then takes the mandrel from the corresponding hole of the inner series and hammers it down upon the disk of gold in the said hole, thereby swaging the edge of the disk and forcing the disk through the hole. He then replaces the mandrel in its proper support and places the disk, having now an upturned edge, in the next-largest hole of the outer series and takes up the mandrel from the corresponding hole of the inner series and repeats the operation, thereby again reducing the diameter of the cup. This operation is repeated until the cup is reduced to the required dimensions. Up to about the eighth hole the holes are graduated to decrease by about one-sixteenth of an inch in diameter; but beyond that they are preferably graduated to decrease by about one sixty-fourth of an inch. This permits the cup to be reduced to any size desired within a sixty-fourth of an inch. At the same time in reducing it to the smallest size it is not necessary to make use of all the intermediate holes, but only, say, of every third or fourth hole. This will be found a sufficiently small difference in size to reduce the cup by successive swagings thereof.

In order to arrest the movement of the draw-plate, so as to bring each hole of the series in succession into the desired position midway between the two anvils, there is provided a spring-catch $l$, secured to the front face of one of the anvils and projecting upwardly from said anvil to lie against the cylindrical face of the draw-plate. Said cylindrical face has a series of recesses $m$ formed therein, and the spring-catch $l$ is stamped or formed so as to have a protuberance $n$, which automatically engages each of the recesses in succession as the draw-plate is rotated, said spring-catch being pressed toward the cylindrical surface of the draw-plate by the force of the spring. The catch is bent over at its upper edge to form a convenient means for withdrawing the protuberance from the recess when it is desired to move the draw-plate to another position.

It is understood that the stand for the draw-plate is secured to a suitable bench or table, and for this purpose the base of the stand is provided with holes $o$, by which it may be so secured.

I claim—

1. In an apparatus of the character described, the combination of a stand, a horizontal apertured draw-plate revolubly mounted thereon, having inner and outer series of apertures, and an anvil or support extending upward from the stand into close proximity with the under surface of the draw-plate, substantially as described.

2. In an apparatus of the character described, the combination of a stand, a horizontal apertured draw-plate revolubly mounted thereon, having inner and outer series of apertures, and two radiating anvils or supports extending upward from the stand into close proximity with the under surface of the draw-plate, substantially as described.

3. In an apparatus of the character described, the combination of a stand, a horizontal apertured draw-plate revolubly mounted thereon, having inner and outer series of apertures, an anvil or support extending upward from the stand into close proximity with the under surface of the draw-plate, and a catch supported on said anvil, said draw-plate having a circular series of recesses arranged to be engaged by said catch in succession in the revolution of the draw-plate, substantially as described.

4. In an apparatus of the character described, the combination of a stand, a horizontal apertured draw-plate revolubly mounted thereon, having inner and outer series of apertures, an anvil or support extending upward from the stand into close proximity with the under surface of the draw-plate, a spring-catch secured upon the front edge or side of the anvil and extending upward and pressed by the force of the spring against the cylindrical surface of the draw-plate, said spring-catch having a protuberance and said cylindrical surface having a circular series of recesses with which said protuberance engages in succession in the revolution of the draw-plate, substantially as described.

In witness whereof I have hereunto set my hand in the presence of two subscribing witnesses.

B. B. BREWER.

Witnesses:
FRANCIS M. WRIGHT,
Z. A. DANIELS.